United States Patent
Pabouctsidis et al.

(10) Patent No.: US 12,074,552 B2
(45) Date of Patent: Aug. 27, 2024

(54) DUAL ENCODER SYSTEM FOR ELECTRIC MOTOR

(71) Applicant: Nidec Motor Corporation, St. Louis, MO (US)

(72) Inventors: Cosma Pabouctsidis, Geneva (CH); Steven C. Bartz, Deephaven, MN (US)

(73) Assignee: Nidec Motor Corporation, St. Louis, MO (US)

( * ) Notice: Subject to any disclaimer, the term of this patent is extended or adjusted under 35 U.S.C. 154(b) by 402 days.

(21) Appl. No.: 17/550,937

(22) Filed: Dec. 14, 2021

(65) Prior Publication Data

US 2023/0142572 A1    May 11, 2023

(30) Foreign Application Priority Data

Nov. 9, 2021   (GR) .............................. 20210100782

(51) Int. Cl.
*H02P 3/22*    (2006.01)
*G01D 3/08*    (2006.01)
(Continued)

(52) U.S. Cl.
CPC ............. *H02P 29/02* (2013.01); *G01D 5/145* (2013.01)

(58) Field of Classification Search
CPC ...... G01D 5/24461; G01D 3/08; G01D 5/145; H02P 29/02; H02P 3/22
(Continued)

(56) References Cited

U.S. PATENT DOCUMENTS

| 5,677,671 A | 10/1997 | Pabla et al. |
| 5,914,796 A | 6/1999 | Selin |

(Continued)

FOREIGN PATENT DOCUMENTS

| CN | 108032743 | 5/2001 |
| JP | 2009142115 | 6/2009 |

(Continued)

OTHER PUBLICATIONS

Office Action from U.S. Appl. No. 17/550,868 Apparatus and Method for Arbitrating Optical Communication Between CAN Buses (May 4, 2023).
(Continued)

*Primary Examiner* — Gabriel Agared
(74) *Attorney, Agent, or Firm* — Hovey Williams LLP

(57) ABSTRACT

A dual encoder system includes first and second encoders on a single printed circuit board mounted on an electric motor. Each encoder independently generates feedback information used by motor and safety controllers for controlling the motor. A single magnet is mounted on the motor shaft. The first encoder cooperates with the magnet to provide first encoder information to the motor controller regarding magnetic alignment between a rotor and a plurality of stator windings of the motor and regarding real-time position and velocity. The second encoder cooperates with the same magnet to provide second encoder information to a safety controller, wherein the second encoder information should be identical to the first. The safety controller may receive the first encoder information from the motor controller, compare the second encoder information to the first encoder information, and brake the electric motor if the second encoder information is different from the first encoder information.

17 Claims, 12 Drawing Sheets

(51) Int. Cl.
*G01D 5/14* (2006.01)
*H02P 29/02* (2016.01)

(58) Field of Classification Search
USPC .................................................. 318/400.21
See application file for complete search history.

(56) References Cited

U.S. PATENT DOCUMENTS

| | | | |
|---|---|---|---|
| 9,114,536 B2 | 8/2015 | Sussman | |
| 9,493,087 B2 | 11/2016 | Leary | |
| 9,614,466 B2 | 4/2017 | Usselman et al. | |
| 9,762,172 B2* | 9/2017 | Lelkes | H02P 29/02 |
| 2005/0179416 A1 | 8/2005 | Iribe et al. | |
| 2009/0058345 A1* | 3/2009 | Cooper | G05B 19/21 |
| | | | 318/602 |
| 2009/0079380 A1* | 3/2009 | Lundell | H02P 29/00 |
| | | | 318/603 |
| 2010/0185357 A1 | 7/2010 | Mizumachi | |
| 2012/0041855 A1 | 2/2012 | Sterling et al. | |
| 2013/0220726 A1 | 8/2013 | Satou et al. | |
| 2015/0160045 A1* | 6/2015 | Buecher | G01D 5/3473 |
| | | | 250/231.13 |
| 2016/0141865 A1 | 5/2016 | Drake et al. | |
| 2018/0069493 A1 | 3/2018 | Roberts | |
| 2018/0275645 A1* | 9/2018 | Matsumura | G01D 5/24461 |
| 2019/0050697 A1 | 2/2019 | Meng et al. | |
| 2020/0041609 A1 | 2/2020 | Ames et al. | |
| 2020/0070032 A1 | 3/2020 | Orady et al. | |
| 2020/0389103 A1* | 12/2020 | Trencseni | H02P 6/24 |
| 2021/0084812 A1 | 3/2021 | Matus et al. | |
| 2021/0206279 A1 | 7/2021 | North et al. | |
| 2021/0210965 A1 | 7/2021 | Roumi et al. | |
| 2023/0074502 A1* | 3/2023 | Bohatsch | G01P 3/44 |
| 2023/0079247 A1 | 3/2023 | Moloney et al. | |

FOREIGN PATENT DOCUMENTS

| | | |
|---|---|---|
| KR | 1020100055920 | 5/2010 |
| WO | 2008062601 | 5/2008 |

OTHER PUBLICATIONS

Mauer, Thomas "TI Designs: TIDA-01487—Isolated CAN FD Repeater Reference Design," Texas Instruments Incorporated (2018).

Office Action from U.S. Appl. No. 17/550,928 entitled Safety Switching System and Method for Braking Electric Motor (Mar. 20, 2023).

International Search Report and Written Opinion for PCT Application No. PCT/US2022/049302 (Dated Mar. 21, 2023).

* cited by examiner

| Safety Control Inputs | Safety Brake Control Inputs | STO Status | 3-Phase Short Status | Electromechanical Brake Status |
|---|---|---|---|---|
| High | High | Disable | Disable | Released |
| Low | High | Active | Active | Engaged after a preset delay |
| Float | High | Active | Active | Engaged after a preset delay |
| High | Low | Disable | Disable | Engaged |
| Low | Low | Active | Active | Engaged |
| Float | Low | Active | Active | Engaged |
| High | Float | Disable | Disable | Released |
| Low | Float | Active | Active | Engaged after a preset delay |
| Float | Float | Active | Active | Engaged after a preset delay |

| Condition | Input Signal | Circuit 1 Output | Circuit 2 Output | Digital Feedback |
|---|---|---|---|---|
| Healthy | 0 | 0 | 0 | 1 |
| Healthy | 1 | 1 | 1 | 1 |
| Short Circuit Fault | 0 | 0 | 0 | 1 |
| Short Circuit Fault | 1 | 1 | 0 | 0 |
| Open Circuit Fault | 0 | 1 | 0 | 0 |
| Open Circuit Fault | 1 | 1 | 1 | 1 |

| Input_CH1 | Input_CH2 | Short Circuit Fault | Open Circuit Fault | Digital Feedback |
|---|---|---|---|---|
| High | High | Yes | X | Low |
| Low | High | No | Yes (Channel 1) | Low |
| High | Low | No | Yes (Channel 2) | Low |
| X | X | No | No | High |

*Fig. 8B.*

DUAL ENCODER SYSTEM FOR ELECTRIC MOTOR

FIELD

The present invention relates to systems and methods for controlling electric motors. More particularly, embodiments of the invention concern a dual encoder system including first and second encoders on a single printed circuit board and using a single magnet, with each encoder independently generating feedback information used by a motor controller and a safety controller for controlling an electric motor.

BACKGROUND

It is sometimes desirable or necessary to brake electric motors in order to slow or stop them, and various systems and methods for braking electric motors are known. However, such systems often include single points of failure that may fail without warning if or when they do fail. Safety is a particular concern in the operation of mobile robots, automatic guided vehicles, and other motorized machinery if the robot, vehicle, or other machine and its load cannot reliably be slowed or stopped in a timely manner.

Additionally, electric motor systems may include multiple encoders. A first encoder may be located in or on the motor and may be configured to generate and transmit first reporting signals only to a motor controller, and a second encoder may be located apart from or outside of the motor (for example, on a wheel) and may be configured to generate and transmit second reporting signals only to a safety controller. Being physically separate units, the first and second encoders must be separately certified, which increases the time and expense required for certification. Further, prior art systems simply assume that the first reporting signals match the second reporting signals.

This background discussion is intended to provide information related to the present invention which is not necessarily prior art.

SUMMARY

Embodiments address the above-described problems and limitations in the prior art, as well as other problems, by providing a dual encoder system that includes first and second encoders on a single printed circuit board and uses a single magnet, wherein each encoder independently generates feedback information used by a motor controller and a safety controller for controlling an electric motor.

An embodiment of the present invention may provide a dual encoder system for use on an electric motor to generate feedback information for controlling the electric motor. The dual encoder system may include a single magnet, a single printed circuit board (PCB), and first and second encoders. The single magnet may be mounted on a shaft of the motor, and the single PCB may be mounted on the motor. The first encoder may be mounted on the single PCB and cooperate with the single magnet to generate and provide first encoder information to a motor controller regarding magnetic alignment between a rotor and a plurality of stator windings of the motor and regarding real-time position and a velocity. The second encoder may be mounted on the single PCB and cooperate with the single magnet to generate and provide second encoder information to a safety controller regarding the magnetic alignment between the rotor and the stator windings of the electric motor and regarding the real-time position and the velocity. The safety controller may be configured to receive the first encoder information from the motor controller, compare the second encoder information to the first encoder information, and brake the electric motor if the second encoder information is different from the first encoder information.

Another embodiment of the present invention may provide a dual encoder system for use in a mobile device to generate feedback information for controlling an electric motor. The mobile device may include the electric motor including a rotor, a plurality of stator windings, and a shaft, a motor controller configured to provide power to and electronically control operation of the motor, and a safety controller. The dual encoder system may include a single magnet, a single PCB, and first and second encoders. The single magnet may be mounted on the shaft of the motor, and the single PCB may be mounted on the motor. The first encoder may be mounted on the single PCB and cooperate with the single magnet to generate and provide first encoder information to the motor controller regarding magnetic alignment between the rotor and the stator windings of the motor and regarding real-time position and velocity. The second encoder may be mounted on the single PCB and cooperate with the single magnet to generate and provide second encoder information to the safety controller regarding the magnetic alignment between the rotor and the stator windings of the motor and regarding the real-time position and the velocity. The safety controller may be configured to receive the first encoder information from the motor controller, compare the second encoder information to the first encoder information, and brake the motor if the second encoder information is different from the first encoder information.

Another embodiment may provide a system including a mobile device and dual encoder system. The mobile device may include an electric motor including a rotor, a plurality of stator windings, and a shaft, a motor controller configured to provide power to and electronically control operation of the motor, and a safety controller. The dual encoder system may be configured to generate feedback information for controlling the motor, and may include a single magnet, a single PCB, and first and second encoders. The single magnet may be mounted on the shaft of the motor, and the single PCB may be mounted on the motor, The first encoder may be mounted on the single PCB and cooperate with the single magnet to generate and provide first encoder information to the motor controller regarding magnetic alignment between the rotor and the stator windings of the motor and regarding real-time position and velocity. The second encoder may be mounted on the single PCB and cooperate with the single magnet to generate and provide second encoder information to a safety controller regarding the magnetic alignment between the rotor and the stator windings of the motor and regarding the real-time position and the velocity. The safety controller may be configured to receive the first encoder information from the motor controller, compare the second encoder information to the first encoder information, and brake the motor if the second encoder information is different from the first encoder information.

Various implementations of the above-described embodiments may include any one or more of the following features. The mobile device may be a mobile robot or an automated guided vehicle. The single magnet may be a ring magnet. The first and second encoders may be incremental or absolute encoders. The first and second encoders may be independently calibrated and separately connected to a power source and an electrical ground. The first encoder may be aligned one hundred and eighty degrees from the second encoder to synchronize the first encoder information and the second encoder information.

The safety controller may brake the motor by activating a torque-off system which brakes the motor by disabling the motor controller and thereby removing power from the motor and causing it to slow due to a load torque and a friction effect. The safety controller may brake the motor by activating a multi-phase shorting system which brakes the motor by diverting power from the stator windings of the motor. The safety controller may brake the motor by activating an electromechanical brake system configured to mechanically brake the motor. The safety controller may perform progressive multi-stage braking of the motor by activating a torque-off system to disable the motor controller to cause the motor to coast to a stop; after a first delay period, activating a multi-phase shorting system to divert power from the plurality of stator windings and thereby shorten a time period required for the motor to stop; and after a second delay period, activating an electromechanical brake system to mechanically brake the motor and thereby further shorten the time period required for the motor to stop.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 2 is a matrix of electronic input signals and the corresponding statuses of the three stages of progressive braking of FIG. 1;

FIG. 8A is a first matrix of digital signals provided by the digital feedback component of FIG. 7 and their meanings;

FIG. 8B is a second matrix of digital signals provided by the digital feedback component of FIG. 7 and their meanings;

Figure 1:
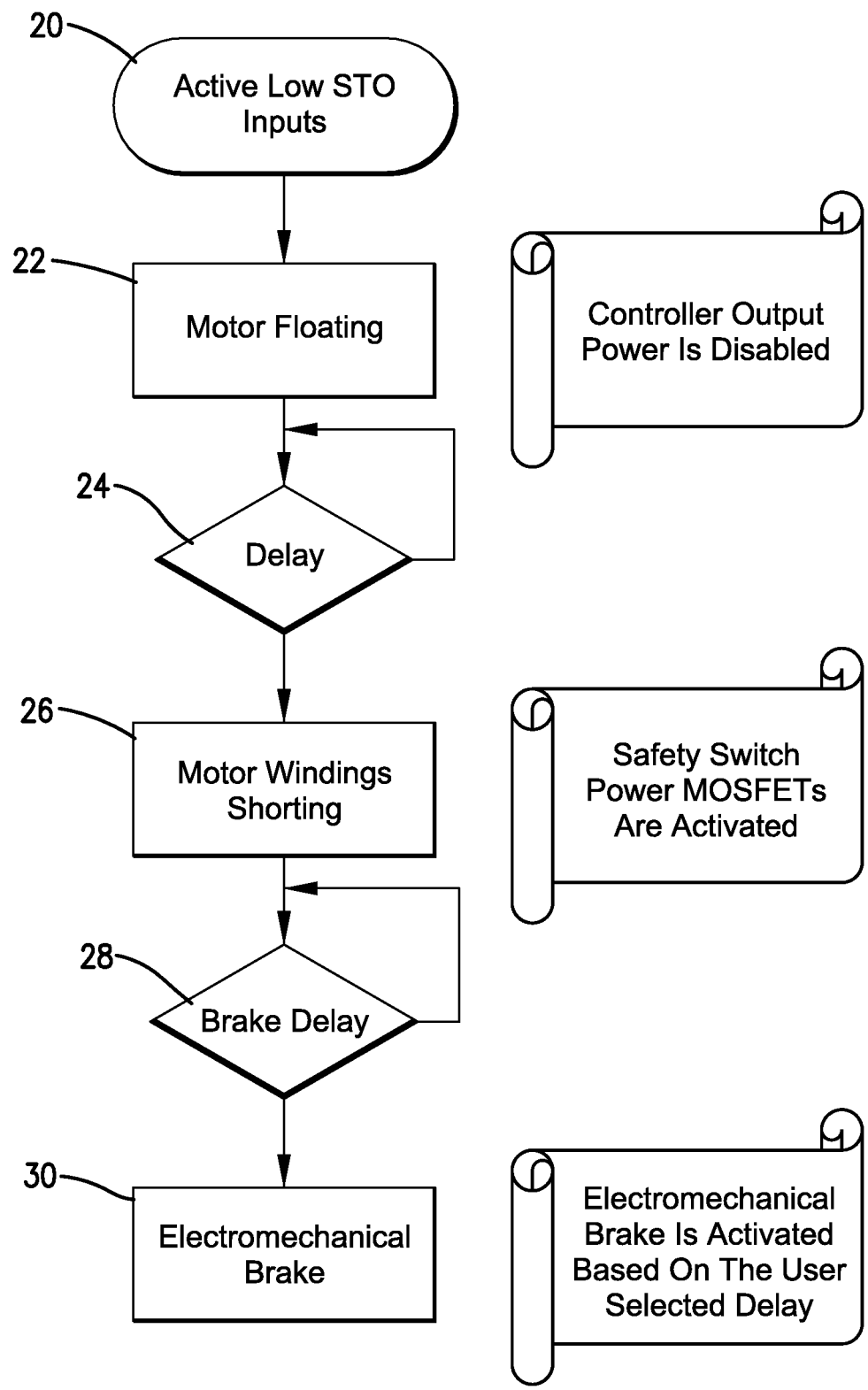
FIG. 1 is a high-level flowchart of steps in an embodiment of a method of the present invention for braking an electric motor, wherein three stages of progressive braking are shown.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a safety switching system and method including multiple independent switching units for braking an electric motor and feedback units for monitoring and reporting the operational readiness of the switching units. In more detail, embodiments provide a safety switching system and method configured to perform progressive multi-stage braking of an electric motor, including implementing multi-phase shorting using multiple independent switching units and independently controlling an electromechanical brake switch unit, and monitor for and report open and/or short circuit faults in the switches to ensure operational readiness. As used herein, "multi-phase" shall mean two or more phases, for example, three phases. Potential applications include any mobile robot, automatic guided vehicle, or other mobile device or other battery-powered direct current motor application Embodiments may provide at least three progressive stages of braking: Disabling the motor controller to de-energize and allow the electric motor to coast to a stop, shorting the windings of the motor to shorten the time required for the motor to stop, and engaging an electromechanical brake to further shorten the time required for the motor to stop. The system may synchronize and otherwise manage activation of each stage to maximize operational efficacy and minimize potential for damage. Further, embodiments may provide an adjustable time delay for engaging the electromechanical brake, and further provide an override feature for immediately engaging the electromechanical brake without regard to the specified time delay. Additionally, embodiments may provide initial and periodic circuit testing to verify that elements, especially the switches, of the system are properly functioning.

Referring to FIGS. 1 and 2, embodiments may be configured to employ at least three stages of braking. First, a torque-off (STO) system may be included and configured to quickly and reliably turn off or otherwise disable the motor controller in order to remove torque-generating energy (power) from the motor, as shown in step 20. By itself, this will cause the motor to "coast" or slow to an eventual standstill due to the inherent braking effects of load torque and/or friction effect, as shown in step 22. The controller may perform a check of the STO system when the larger system is turned on and every time the STO inputs go from any state to both high. Once the STO system is verified to work, the controller can safely allow the motor to be energized.

Second, rather than rely entirely on load torque or friction to brake the motor, after a delay, shown in step 24, a multi-phase short condition may be imposed on the motor windings, as shown in step 26. This absorbs a percentage of the motor energy and shortens the time required for the motor to stop. More specifically, activation of the STO may be followed by triggering of the multi-phase shorting of the motor windings. The STO feature may be engaged so that the controller's ability to energize the motor is turned off before shorting the motor phases to prevent an over-current situation. Further, the switches may be a predefined delay after activation of the STO to avoid damaging the motor controller due to the short circuit at the controller outputs.

Third, after an adjustable time delay (of, for example, one to six seconds), as shown in step 28, an electromechanical brake may be engaged to further shorten the time required for the motor to stop, as shown in step 30. Under certain conditions, the time delay may be ignored and the electromechanical brake may be engaged immediately. Engagement of the electromechanical brake may be controlled by hardware and/or by a safety controller.

Referring particularly to FIG. 2, a matrix is shown of electronic input signals 21 and the corresponding statuses of the above-described three stages of progressive braking, specifically, the STO status 23 (wherein "active" means that the motor controller power output is off), the multi-phase short status 27 (wherein "active" means that the power switches are on, thereby shorting the motor phases to ground), and the electromechanical brake status 31.

Figure 3:
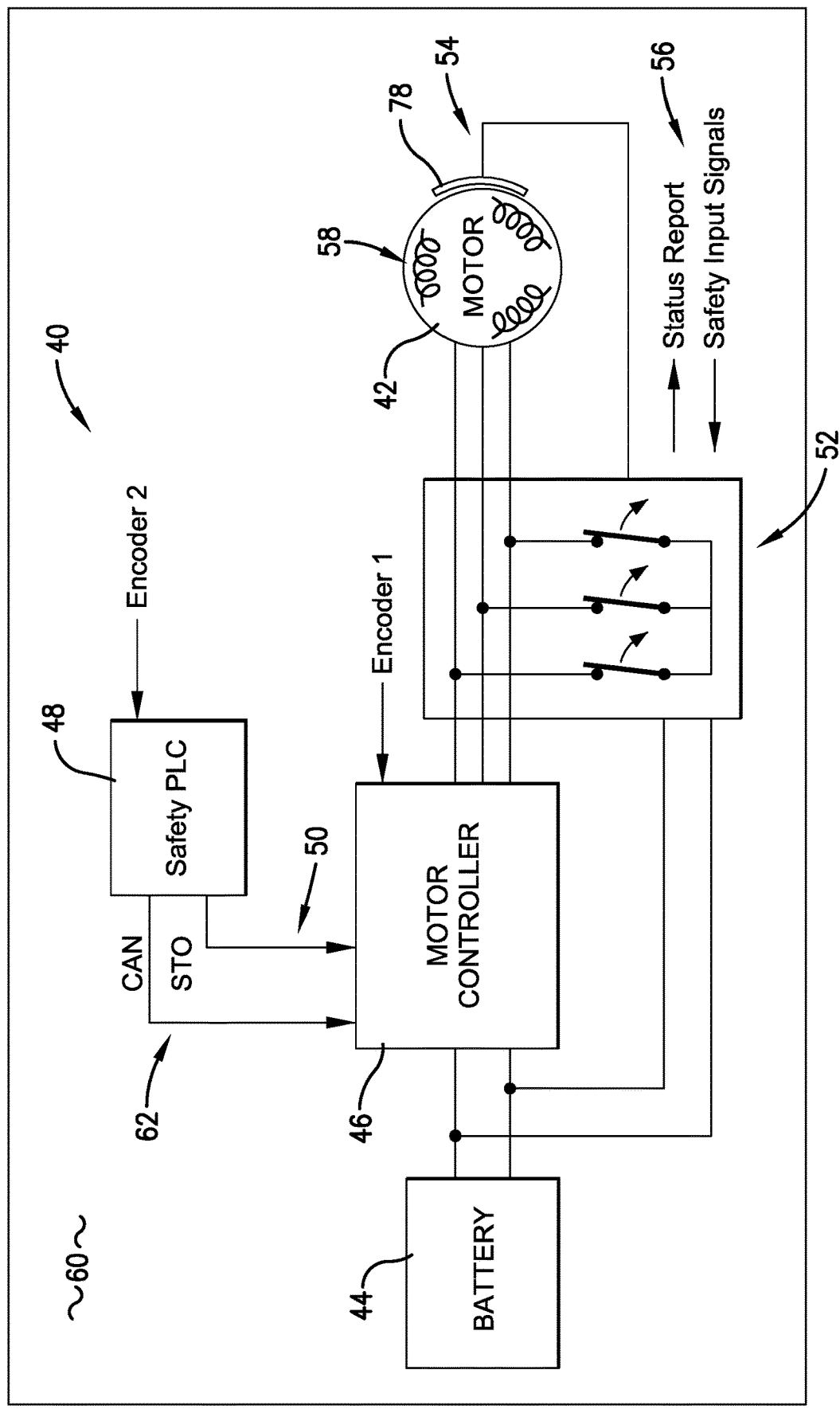
FIG. 3 is a high level component diagram of an embodiment of a safety switching system for braking an electric motor.

Referring also to FIGS. 3-10, in one embodiment, a safety switching system 40 may be provided to perform progressive multi-stage braking of an electric motor 42 and to monitor and report operational readiness of system components, particularly system switches. Referring particularly to FIG. 3, the system 40 may broadly include the electric motor 42, a battery 44, a motor controller 46 providing multi-phase power to the motor 42, a safety controller 48, an STO system 50, a multi-phase shorting system 52, an electromechanical brake system 54, and a feedback system 56. Some or all of these components may be incorporated into a mobile device 60, which may be, for example, a mobile robot or an automatic guided vehicle. The safety controller 48 may be substantially any suitable component or system for performing the functions described herein, such as a certified safety controller or a supervisory controller or supervisory system with additional monitoring and/or supervisory responsibilities.

The electric motor 42 may be configured to turn and thereby drive a load, and may include multiple windings 58. In one implementation, the motor 48 may utilize three-phase power and include three such windings 58. The battery 44 may be configured to provide direct current (DC) power to the motor controller 46 and to the safety controller 48, the multi-phase shorting system 52, and the electromechanical brake system 54. The motor controller 46 may be configured to electronically control operation of the motor 42, including power, speed, and torque, including converting the DC power provided by the battery 44 to multi-phase alternating current (AC) power and to provide single phase power to each of the windings 58 of the motor 42 in order to turn the motor 42. The motor controller 46 may be a single channel or multiple channel (for example, dual channel) device. The safety controller 48 may be configured to transmit signals to the motor controller 46, multi-phase shorting system 52, and electromechanical brake system 54, and to receive signals from the feedback system 56. Communications to and from the safety controller 48 and other components of the system 40 may be facilitated by a controller area network (CAN) bus 62.

The STO system 50 may be configured to quickly and reliably turn-off or otherwise disable the motor controller 46 in such a manner as to remove torque-generating energy from the motor 42. By itself, this will cause the motor 42 to coast to an eventual standstill due to the inherent braking effects of load torque and/or friction effect.

The safety controller 48 may perform a check of the STO system 50 whenever power is turned on and whenever the STO inputs go from any state to both high and verify the ability of the STO system 50 to disable the motor controller 46. If the STO system 50 is malfunctioning and cannot disable the motor controller 46, the safety switching system 40 may prevent the motor 42 from starting. Activation of this first stage STO braking may be followed by triggering of the second stage multi-phase shorting of the motor windings 58.

Figure 4:
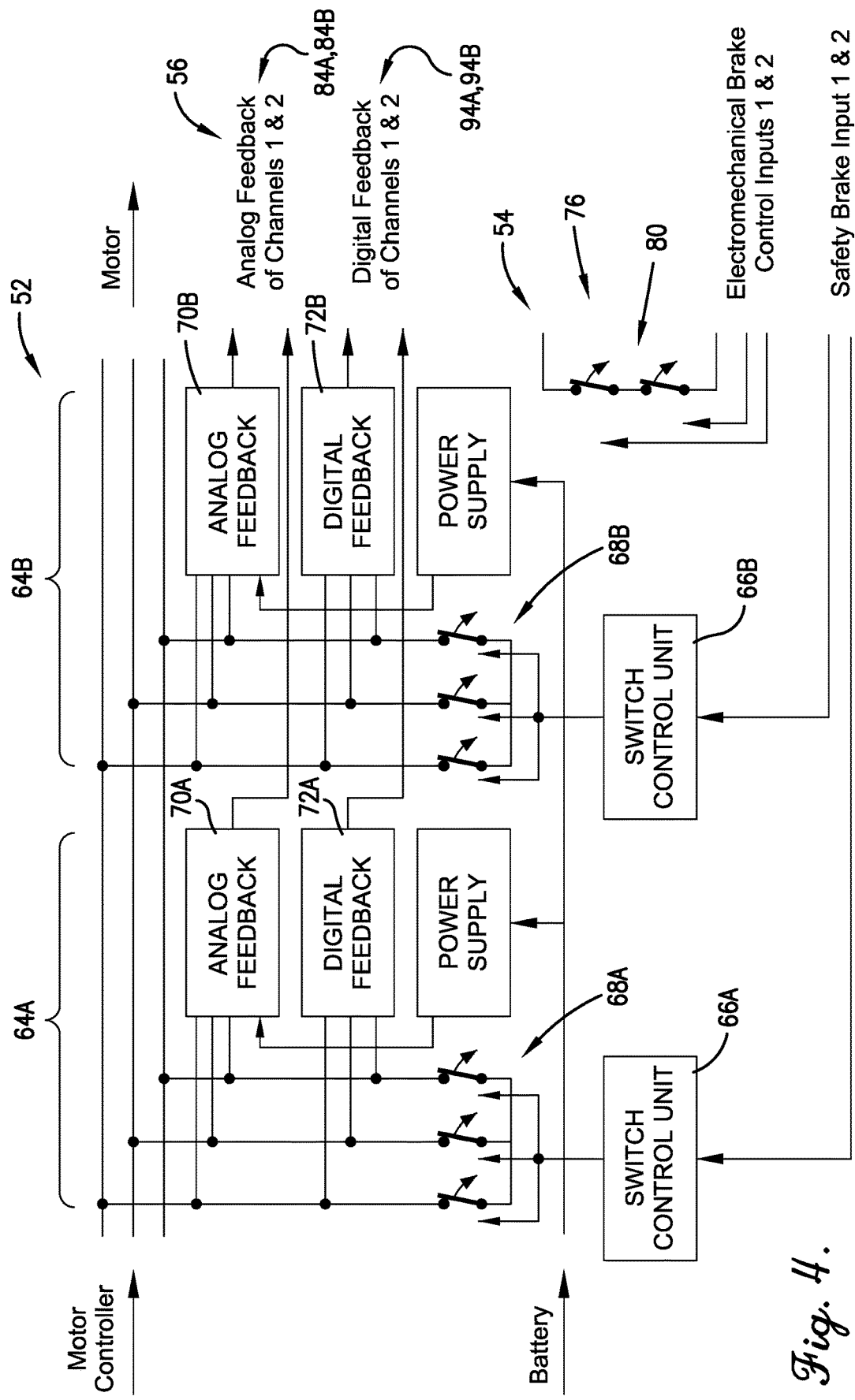
FIG. 4 is a component diagram of a multi-phase shorting system and an electromechanical brake system of the system of FIG. 3.

Referring particularly to FIG. 4, the multi-phase shorting system 52 may be configured to short the windings 58 of the motor 42 in order to absorb a percentage of the motor energy and shorten the time required for the motor 42 to stop. The multi-phase shorting system 52 may include first and second independent switching units 64A,64B electrically connected to the motor windings 58. Each of the first and second switching units 64A,64B may include a switch control unit 66A,66B, multiple normally-closed solid state switches 68A,68B electrically connected at one end to the lines carrying power from the motor controller 46 to the motor windings 58 and at the other end to electrical ground, and analog feedback units 70A,70B and/or digital feedback units 72A,72B. In various implementations, the switches 68A, 68B may be substantially any suitable power transistor, such as MOSFETs, Gallium Nitride field effect transistors (GaN_FETs), or insulated-gate bipolar transistors (IGBTs). During normal operation, each switch control units 66A,66B may receive two independent active-low control signals from the safety controller 48. The feedback units 70A,70B, 72A,72B may provide status reports to the safety controller 48 through analog and digital signals which are used to diagnose open and short circuit faults in the switches 68A, 68B.

Before activating the multi-phase shorting system 52, the STO system 50 may already be activated so that the ability of the motor controller 46 to energize the motor 42 is turned off before shorting the motor windings 58 to prevent an over-current situation. Further, the switches 68A,68B may be triggered a predefined delay after activation of the STO system 50 to avoid damaging the motor controller 46 due to the short circuit at the controller outputs. The first and second switching units 64A,64B may be configured to interrupt the power provided by the motor controller 46 to the windings 58 of the motor 42. The switching units 64A,64B may divert this power to electrical ground. Each of the first and second switching units 64A,64B may operate independent of the other so that if one fails to activate the other may not. Operation of each of the first and second switching units 64A,64B may be powered by the battery 44.

More specifically, each switch control unit 66A,66B may be configured to cause its normally-closed switches 68A, 68B to close and thereby divert power away from the respective motor windings 58. Each switch 68A,68B may be configured to connect a respective motor winding to ground. Thus, for example, in the implementation in which there are three motor windings, each switching unit 64A,64B may include first, second, and third switches.

In one implementation, the multi-phase shorting system 52 may be controlled by two independent active low safety input signals from the safety controller 48. By default, the switches 68A,68B may impose a short circuit condition when the multi-phase shorting system 52 is powered on. If both input signals to the STO system 50 are changed to high, the short circuit condition of the multi-phase shorting system 52 may be cleared and the motor 42 allowed to operate normally. Consequently, if any of these input signals becomes low or float, the multi-phase shorting system 52 may be reset to default to implement the multi-phase shorting condition.

If the battery 44 is disconnected and input power is lost to the multi-phase shorting system 52, the switches 68A,68B may not be controllable regardless of the state of the STO input signals. In this case, the electromechanical brake system 54 may be engaged to implement braking due to the presence of a crucial fault. The electromechanical brake system 54 may also be controlled by the safety controller 48 through two active low signals which deactivate the time delay at the high side switches of the electromechanical brake system 54 and allow for immediate engagement.

The electromechanical brake system 54 may be configured to mechanically brake the motor 42 to further shorten the time required for the motor 42 to stop. The electromechanical brake system 54 may operate independently of the first and second multi-phase switching units. The electromechanical brake system 54 may include a third switching unit 76 connected to an electromechanical brake 78, and analog and/or digital feedback units (not shown, but similar or identical to the analog and digital feedback units of the multi-phase shorting system 52) reporting operational conditions to the safety controller 48. The third switching unit 76 may include two normally-open switches 80 connected to the electromechanical brake 78 and controlled by two independent active-low control signals from the safety controller 48.

The safety controller 48 may wait a pre-established delay period before activating the electromechanical brake 78. In one implementation, there may be between one and six user-selectable delay periods of one second increments. Additionally or alternatively, the safety controller 48 may provide an independent input for activating the electromechanical brake 78 immediately and without regard to the pre-established a delay period.

In one implementation, the safety switch system may have two pairs of safety signals as inputs and one pair of safety signals as outputs. More specifically, two safety control inputs may trigger the multi-phase short and, after a delay, the electromagnetic brake, two safety brake control inputs may activate the electromagnetic brake without a delay, and two safety output signals may be sent to the motor controller to trigger the STO function. In a first (parallel) wiring implementation, the safety controller may send one pair of safety control signals to the safety switch, one pair of STO signals to the motor controller, and one pair of safe brake signals to the safety switch. In an alternative second (series) wiring implementation, the safety controller may send one pair of safety control signals to the safety switch and one pair of safe brake signals to the safety switch, and the safety switch sends the pair of STO signals to the motor controller. In the latter implementation, the safety switch, rather than safety controller, may control the time delay between triggering the STO function and triggering the multi-phase short function.

The feedback system 56 may be configured to allow the safety controller 48 to check operational readiness when the braking systems 50,52,54 are powered on, when the safety brake inputs are toggled, and at regular intervals if the systems are not powered off, in order to detect a failure of any of the switches 68A,68B,80 in the form of a short or open circuit condition.

Figure 5:
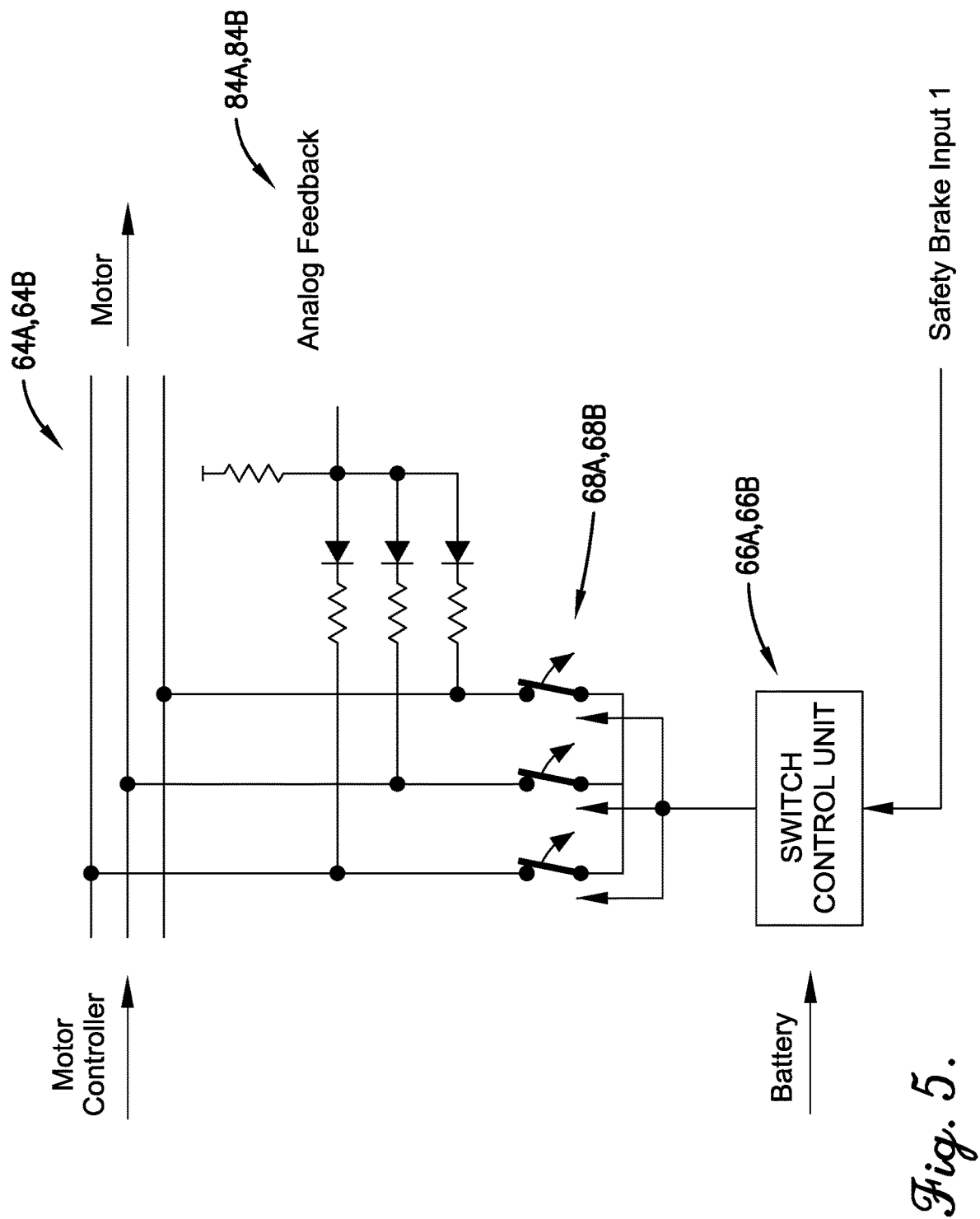
FIG. 5 is a component diagram of an implementation of an analog feedback unit component of the system of FIG. 3.
Figure 6:
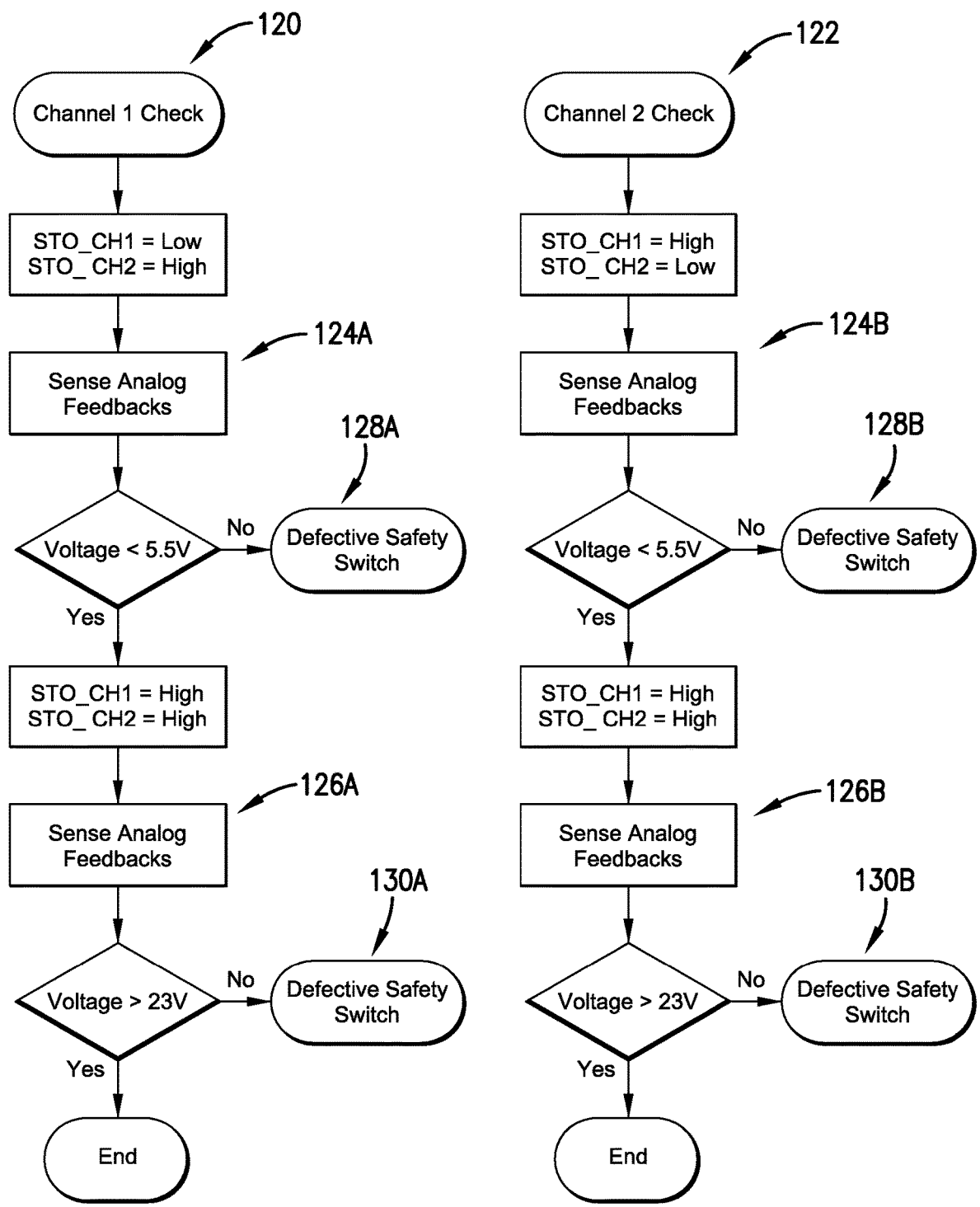
FIG. 6 is a flowchart of steps in the operation of the analog feedback unit of FIG. 5.

Referring particularly to FIGS. 5-9, in one implementation, the multi-phase shorting system 52 may report its status to the safety controller 48 as an analog and/or a digital signal. Referring particularly to FIGS. 5 and 6, as discussed, each of the first and second switching units 64A,64B may include the analog feedback unit 70A,70B configured to monitor one or more relevant operational characteristics of the switches 68A,68B and report the results via analog signals 84A,84B to the safety controller 48. Because the switches 68A,68B of the two switching channels are connected in parallel, each channel may be checked independently, as reflected in the separate paths 120,122 shown in FIG. 6. Thus, the safety input signals are used to disable the one channel in order to check the condition of the other channel through the feedback signals. Once normal operation of the one channel switches is verified, the procedure can be repeated for the other channel. Because the switches 68A,68B of each channel may be controlled by a single input signal, the condition monitoring procedure is simplified for the safety controller 48 as the feedback signals provide a general status report. In one implementation, the analog feedback reports open or short circuit faults within a wide range. The analog output signals provide the required information to detect a failure of any of the switches 68A,68B. The different voltage feedback values are read and interpreted by the safety controller (steps 124A,124B,126A, 126B) during the self-check process to identify defective switches (steps 128A,128B,130A,130B).

Figure 7:
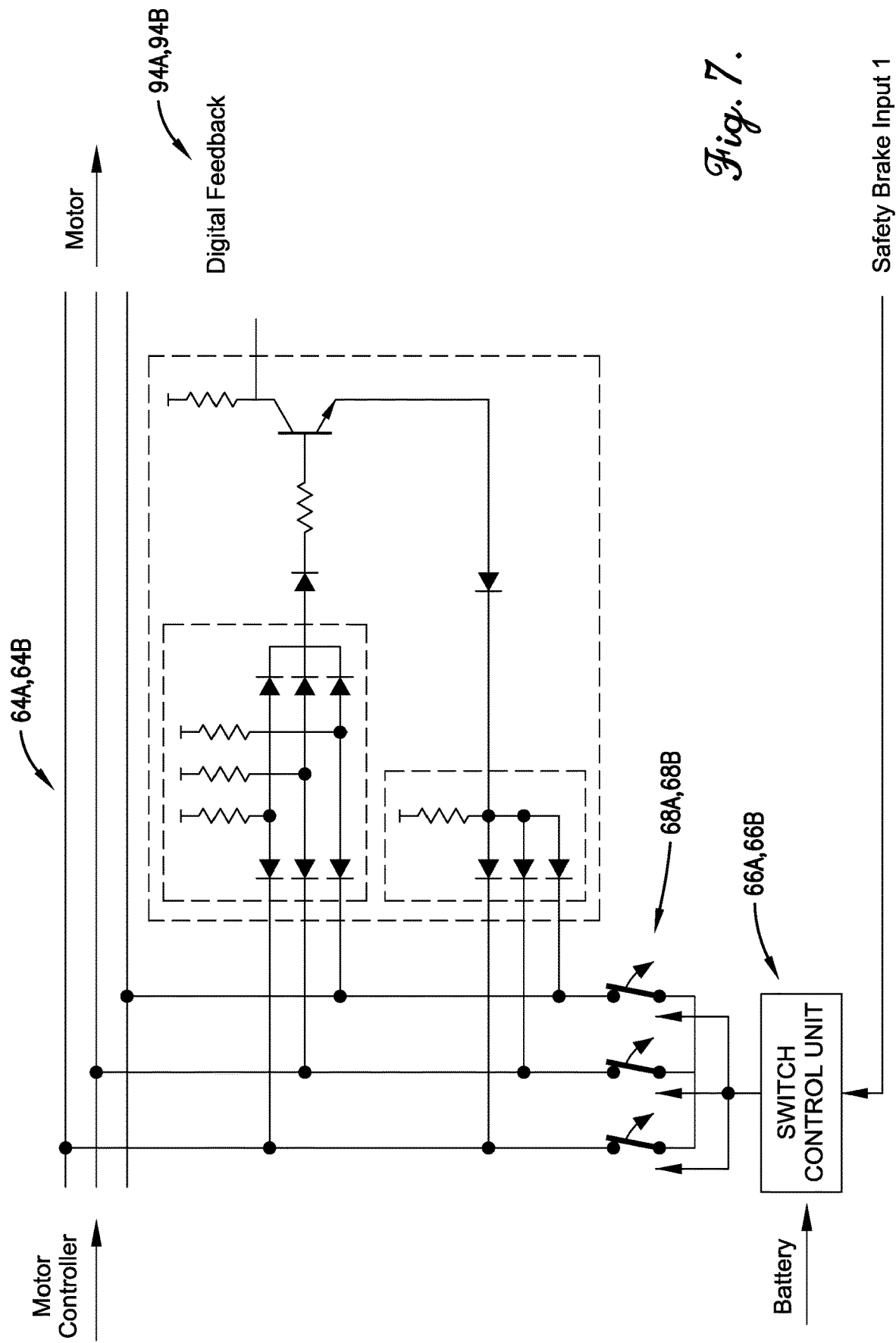
FIG. 7 is a component diagram of an implementation of a digital feedback unit component of the system of FIG. 3.
Figure 9:
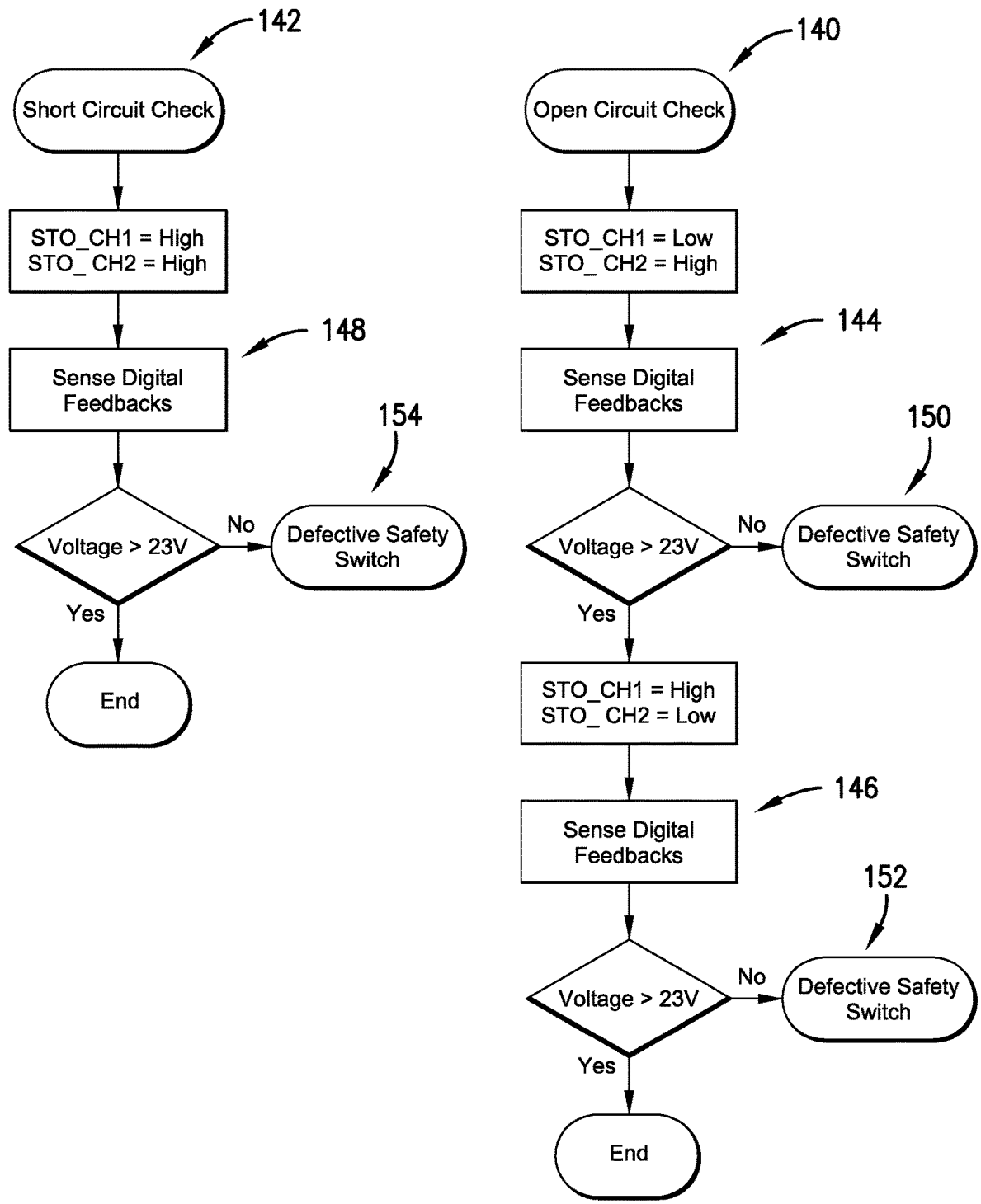
FIG. 9 is a flowchart of steps in the operation of the digital feedback unit of FIG. 7.

Additionally or alternatively, referring particularly to FIGS. 7-9, as discussed, each of the first and second switching units 64A,64B may include the digital feedback unit 72A,72B configured to monitor one or more relevant operational characteristics of the switches 68A,68B and report the results via digital signals 94A,94B to the safety controller 48. In one implementation, the digital feedback may have a normally high or first output signal (typically characterized as a "one") and report open or short circuit faults with a low or second output signal (typically characterized as a "zero"). As shown in FIGS. 7A and 7B, the two channels of the multi-phase shorting system 52 may be checked independently for the detection of an open circuit component failure (path 140) shown in FIG. 9, but can be checked simultaneously for the short circuit detection (path 142). Because the switches 68A,68B of each channel may be controlled by a single input signal, the condition monitoring procedure is simplified for the safety controller 48 as the feedback signals provide a general status report. In one implementation, the digital feedback reports open or short circuit faults within a wide range. The digital output signals provide the required information to detect a failure of any of the switches

68A,68B. The different feedback values are read and interpreted by the safety controller (steps 144,146,148) during the self-check process to identify defective switches (steps 150,152,154).

Figure 10:
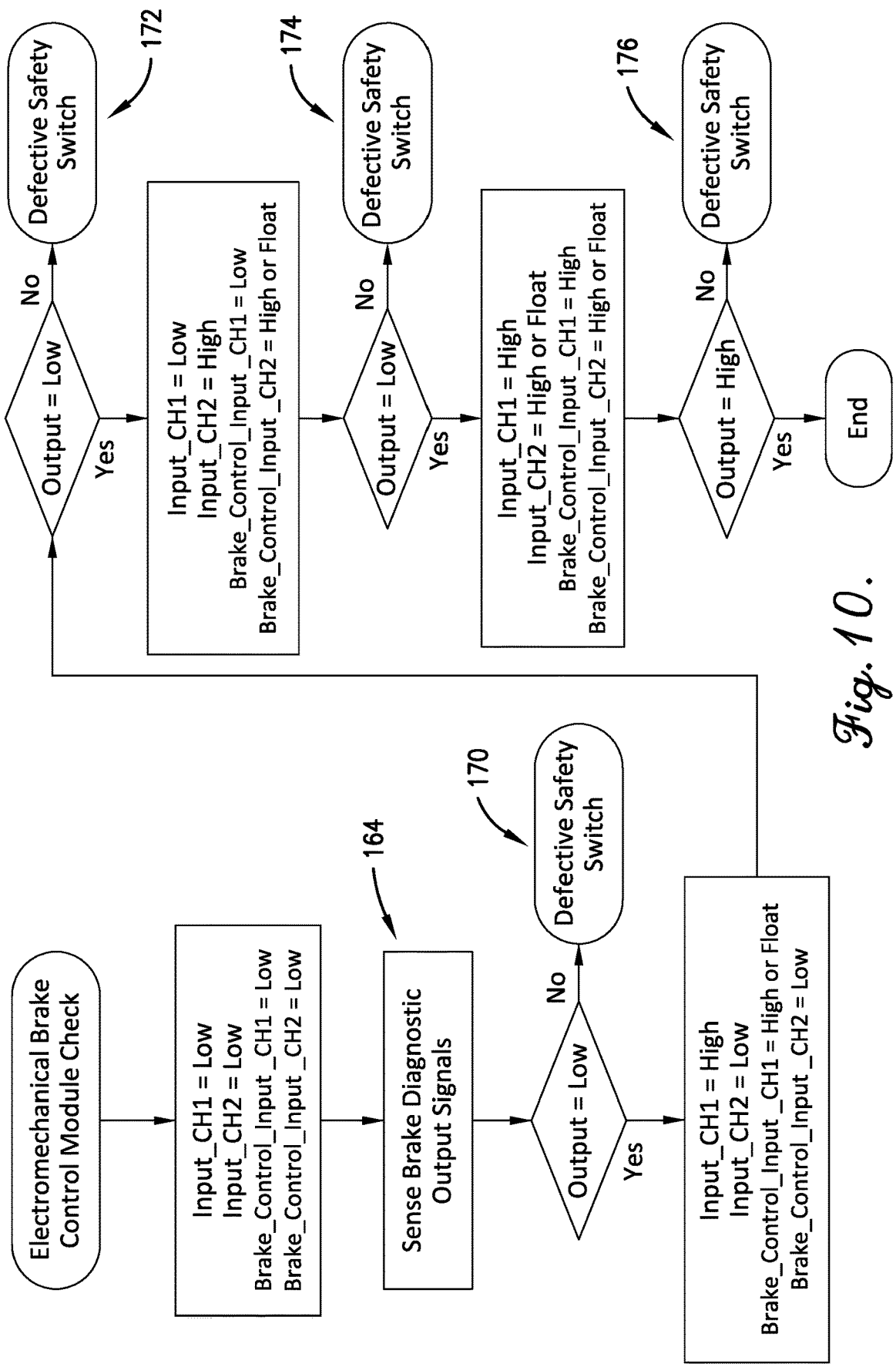
FIG. 10 is a flowchart of steps in the operation of the digital feedback unit with regard to the operation of a third switching unit associated with an electromagnetic brake.

Additionally, referring to FIG. 10, the feedback system 56 may be extended to encompass the switches 80 of the electromechanical brake system 54 as well. The digital output signals provide the required information to detect a failure of any of the switches 80. The different feedback values are read and interpreted by the safety controller (step 164) during the self-check process to identify defective switches (steps 170,172,174,176).

In operation, the safety controller 48 may detect the fault through the feedback signals 84A,84B,94A,94B and, in response, change the active-low control signals to high and thereby close the switches 68A,68B of the first and second switching units 64A,64B to short-circuit the motor windings 58 and open the switches 80 of the third switching unit 76 to engage the electromechanical brake 78. Because the plurality of switching units 64A,64B,76 are independent of each other, the failure of one to function properly does not prevent the others from functioning to brake the motor 42.

In one implementation, the system may use one motor controller and one safety controller to control multiple motors and multiple safety switching systems, with each motor having its own safety switching system. From the perspective of each motor, the system may function substantially similar or identical to the embodiments and implementations described above.

Figure 11:
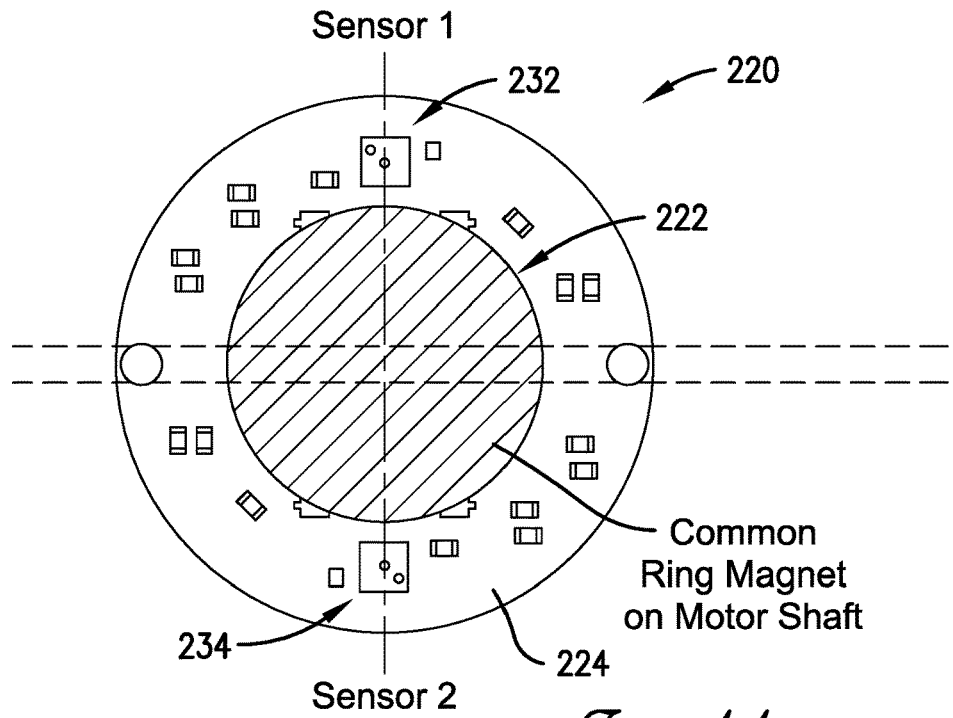
FIG. 11 is a first side view depiction of a dual encoder system for use on an electric motor to generate feedback information, showing a ring magnet component on a shaft of the electric motor.
Figure 12:
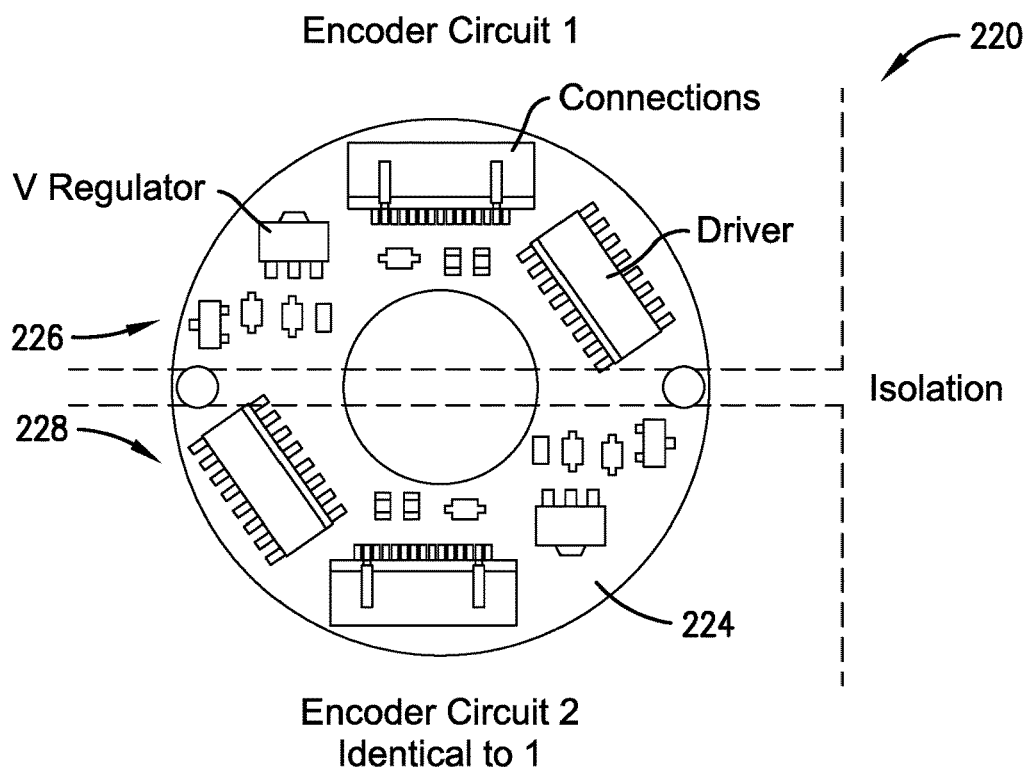
FIG. 12 is a second side view depiction of the dual encoder system of FIG. 11, showing first and second encoder components on a single PCB.
Figure 13:
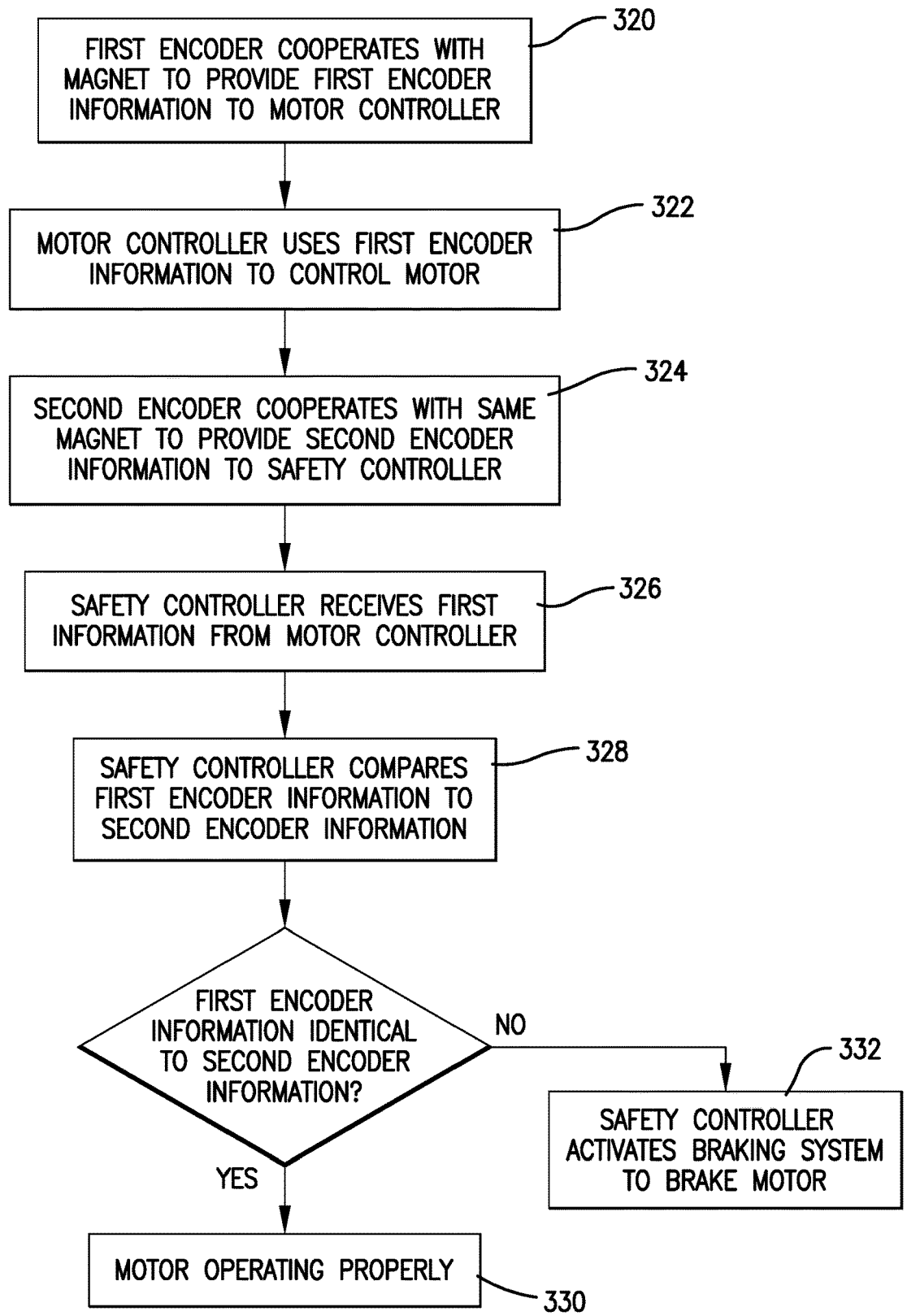
FIG. 13 is a flowchart of steps in example operation of the dual encoder system of FIGS. 11 and 12.

Referring also to FIGS. 11-13, embodiments of the present invention provide a dual encoder system 220 for use on an electric motor to generate feedback information, including fully redundant position, velocity, and commutation data, on a single PCB and using a single magnet, wherein the information may be used for controlling the motor. In one implementation, the dual encoder system 220 may be used with embodiments and implementations of the mobile device 60 and/or the safety switching system 40 described above. For example, the dual encoder system 220 may be used with the mobile device 60 including the electric motor 42 including the rotor, the plurality of stator windings 58, and a shaft, the motor controller 46 configured to provide power to and electronically control operation of the motor 42, the safety controller 48, and the safety switching system 40 as described above. The mobile device 60 may be, for example, a mobile robot or an automated guided vehicle.

The dual encoder system 220 may include a single magnet 222, a single PCB 224, a first encoder 226, and a second encoder 228. The single magnet 222 may be mounted on the shaft of the motor 42, and may be configured to produce a magnetic field which is sensible by both the first and second encoders 226,228. In one implementation, the single magnet 222 may be a ring magnet mounted on the shaft. The single PCB 224 may be mounted on the motor 42, such as on a back of the motor 42, and may be configured to physical support both the first and second encoders 226,228. Indirect mounting of the PCB 224 on the motor 42 is also within the ambit of the present invention.

The term "single" as used herein with respect to the magnet 222 and PCB 224 simply means that only one (1) magnet and only one (1) PCB are necessary or associated with the encoders 226,228 to provide the functionality of the system 220, as described herein. That is to say, the motor 42 may be provided with other magnets and/or PCBs for other purposes, without departing from the scope of the present invention.

The first encoder 226 may be mounted on the single PCB 224, and may be configured to operationally cooperate with the single magnet 222 to generate and provide first encoder information to the motor controller 46 regarding one or more operational characteristics of the motor 42, such as a magnetic alignment between the rotor and the stator windings 58 of the motor 42, which may be used to commutate the motor 42, and real-time position and velocity, which may be used by motor control algorithms. The first encoder 226 may include a first Hall effect sensor 232. For incremental encoders the information may be transmitted as A/B quadrature encoded, commutation (UVW), and/or Hall effect signals, and for absolute encoders the signals may use a serial communications bus interface such as SPI, SSI, CANOpen, or EnDat.

The second encoder 228 may be also be mounted on the same single PCB 224, and may be configured to operationally cooperate with the same single magnet 222 to generate and provide second encoder information to the safety controller 48 regarding the one or more operational characteristics of the motor 42, such as that magnetic alignment between the rotor and the stator windings 58 of the motor 42 and the real-time position and velocity. The second encoder may include a second Hall effect sensor 234. When the system is operating properly, the first encoder information should be approximately identical to the second encoder information.

In various implementation, the encoders 226,228 may be incremental encoders or absolute encoders. The first and second encoders 226,228 may be independently calibrated and separately connected to a power source and an electrical ground. The first encoder 226 may be aligned one hundred and eighty degrees from the second encoder 228 (as seen in FIG. 12) to synchronize the first encoder information and the second encoder information.

Referring particularly to FIG. 13, in operation, the first encoder 226 may cooperate with the magnet 222 to generate and provide the first encoder information to the motor controller 46, as shown in 320. The motor controller 46 may use the first information to control the motor 42, as shown in 322. The second encoder 228 may cooperate with the magnet 222 to generate and provide the second encoder information to the safety controller 48, as shown in 324. The safety controller 48 may receive the first encoder information from the motor controller 46, as shown in 326, and compare the second encoder information to the first encoder information, as shown in 328. If the first and second encoder information is approximately identical, then the motor 42 is operating properly, as shown in 330.

If the first encoder information is different from the second encoder information, then the safety controller 48 may brake the motor 42, as shown in 332. For example, as described above, the safety controller 48 may brake the motor 42 by activating the STO system 50 which brakes the motor 42 by disabling the motor controller 46 and thereby removing power from the motor 42 and causing it to slow due to a load torque and a friction effect. Additionally or alternatively, the safety controller 48 may brake the motor 42 by activating the three-phase shorting system 52 which brakes the motor 42 by diverting power from the plurality of stator windings 58 of the motor 42. Additionally or alternatively, the safety controller 48 may brake the motor 42 by activating the electromechanical brake system 54 configured to mechanically brake the motor 42.

In one implementation, the safety controller 48 may perform progressive multi-stage braking of the motor 42 by activating the STO system 50 to disable the motor controller 46 to cause the motor 42 to coast to a stop; after a first delay period, activate the three-phase shorting system 52 to divert power from the stator windings 58 of the motor 42 and thereby shorten a time period required for the motor 42 to stop; and after a second delay period, activate the electromechanical brake system 54 to mechanically brake the motor 42 and thereby further shorten the time period required for the motor 42 to stop. Additional features of the safety switching system 40 may be used with the dual encoder system 220.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A dual encoder system for use on an electric motor to generate feedback information for controlling the electric motor, the dual encoder system comprising:
    a single magnet mounted on a shaft of the electric motor;
    a single printed circuit board mounted on the electric motor;
    a first encoder mounted on the single printed circuit board and cooperating with the single magnet to generate and provide a first encoder information to a motor controller regarding one or more operational characteristics of the electric motor; and
    a second encoder mounted on the single printed circuit board and cooperating with the single magnet to generate and provide a second encoder information to a safety controller regarding the one or more operational characteristics of the electric motor,
    wherein the safety controller is configured to receive the first encoder information from the motor controller, compare the second encoder information to the first encoder information, and brake the electric motor if the second encoder information is different from the first encoder information,
    wherein the safety controller performs progressive multi-stage braking of the electric motor by activating a torque-off system to disable the motor controller to cause the electric motor to coast to a stop;
    after a first delay period, activating a multi-phase shorting system to divert power from the plurality of stator windings of the electric motor and thereby shorten a time period required for the electric motor to stop; and
    after a second delay period, activating an electromechanical brake system to mechanically brake the electric motor and thereby further shorten the time period required for the electric motor to stop.

2. The dual encoder system of claim 1, wherein the single magnet is a ring magnet.

3. The dual encoder system of claim 1, wherein the first and second encoders are incremental encoders.

4. The dual encoder system of claim 1, wherein the first and second encoders are absolute encoders.

5. The dual encoder system of claim 1, wherein the first encoder and the second encoder are independently calibrated and separately connected to a power source and an electrical ground.

6. The dual encoder system of claim 1, wherein the first encoder is aligned one hundred and eighty degrees from the second encoder to synchronize the first encoder information and the second encoder information.

7. The dual encoder system of claim 1, wherein the safety controller brakes the electric motor by the torque-off system which brakes the electric motor by disabling the motor controller and thereby removing power from the electric motor and causing the electric motor to slow due to a load torque and a friction effect.

8. The dual encoder system of claim 1, wherein the safety controller brakes the electric motor by the multi-phase shorting system which brakes the motor by diverting power from the plurality of stator windings of the electric motor.

9. A dual encoder system for use in a mobile device to generate feedback information for controlling an electric motor, the mobile device including the electric motor including a rotor, a plurality of stator windings, and a shaft, a motor controller configured to provide power to and electronically control operation of the electric motor, and a safety controller, the dual encoder system comprising:
    a single magnet mounted on the shaft of the electric motor,
    a single printed circuit board mounted on the electric motor,
    a first encoder mounted on the single printed circuit board and cooperating with the single magnet to generate and provide a first encoder information to the motor controller regarding a magnetic alignment between the rotor and the plurality of stator windings of the electric motor and regarding a real-time position and a velocity, and
    a second encoder mounted on the single printed circuit board and cooperating with the single magnet to generate and provide a second encoder information to the safety controller regarding the magnetic alignment between the rotor and the plurality of stator windings of the electric motor and regarding the real-time position and the velocity,
    wherein the safety controller is configured to receive the first encoder information from the motor controller, compare the second encoder information to the first encoder information, and brake the electric motor if the second encoder information is different from the first encoder information,
    wherein the safety controller performs progressive multi-stage braking of the electric motor by activating a torque-off system to disable the motor controller to cause the electric motor to coast to a stop;
    after a first delay period, activating a multi-phase shorting system to divert power from the plurality of stator windings of the electric motor and thereby shorten a time period required for the electric motor to stop; and
    after a second delay period, activating an electromechanical brake system to mechanically brake the electric motor and thereby further shorten the time period required for the electric motor to stop.

10. The dual encoder system of claim 9, wherein the mobile device is a mobile robot.

11. The dual encoder system of claim 9, wherein the mobile device is an automated guided vehicle.

12. The dual encoder system of claim 9, wherein the single magnet is a ring magnet.

13. The dual encoder system of claim 9, wherein the first and second encoders are incremental encoders.

14. The dual encoder system of claim 9, wherein the first and second encoders are absolute encoders.

15. The dual encoder system of claim 9, wherein the first encoder and the second encoder are independently calibrated and separately connected to a power source and an electrical ground.

16. The dual encoder system of claim 9, wherein first encoder is aligned one hundred and eighty degrees from the second encoder to synchronize the first encoder information and the second encoder information.

17. A system comprising:
a mobile device including—
an electric motor including a rotor, a plurality of stator windings, and a shaft, a motor controller configured to provide power to and electronically control operation of the electric motor, and
a safety controller; and
a dual encoder system configured to generate feedback information for controlling the electric motor, the dual encoder system including—
a single magnet mounted on the shaft of the electric motor,
a single printed circuit board mounted on the electric motor,
a first encoder mounted on the single printed circuit board and cooperating with the single magnet to generate and provide a first encoder information to the motor controller regarding a magnetic alignment between the rotor and the plurality of stator windings of the electric motor and regarding a real-time position and a velocity, and
a second encoder mounted on the single printed circuit board and cooperating with the single magnet to generate and provide a second encoder information to the safety controller regarding the magnetic alignment between the rotor and the plurality of stator windings of the electric motor and regarding the real-time position and the velocity,
wherein the safety controller is configured to receive the first encoder information from the motor controller, compare the second encoder information to the first encoder information, and brakes the electric motor if the second encoder information is different from the first encoder information,
wherein the safety controller performs progressive multi-stage braking of the electric motor by activating a torque-off system to disable the motor controller to cause the electric motor to coast to a stop;
after a first delay period, activating a multi-phase shorting system to divert power from the plurality of stator windings of the electric motor and thereby shorten a time period required for the electric motor to stop; and
after a second delay period, activating an electromechanical brake system to mechanically brake the electric motor and thereby further shorten the time period required for the electric motor to stop.

* * * * *